(12) United States Patent
Sciammarella et al.

(10) Patent No.: US 6,425,129 B1
(45) Date of Patent: Jul. 23, 2002

(54) CHANNEL PREVIEW WITH RATE DEPENDENT CHANNEL INFORMATION

(75) Inventors: Eduardo A. Sciammarella; Andrew M. Proehl, both of New York, NY (US)

(73) Assignees: Sony Corporation, Tokyo (JP); Sony Corporation of America, New York, NY (US)

( * ) Notice: Subject to any disclaimer, the term of this patent is extended or adjusted under 35 U.S.C. 154(b) by 0 days.

(21) Appl. No.: 09/283,370

(22) Filed: Mar. 31, 1999

(51) Int. Cl.[7] .................. H04N 5/445; H04N 7/173; G06F 3/00; G06F 13/00
(52) U.S. Cl. .................. 725/38; 725/39; 725/52; 725/57
(58) Field of Search .................. 725/38, 39, 40, 725/41, 43, 44, 52, 53, 56, 57, 61, 37, 87, 88, 102, 104; H04N 5/445, 7/173; G06F 3/00, 13/00

(56) References Cited

U.S. PATENT DOCUMENTS

| | | | |
|---|---|---|---|
| 5,544,354 A | * 8/1996 | May et al. | 707/7 |
| 5,815,146 A | * 9/1998 | Youden et al. | 725/88 |
| 5,832,287 A | * 11/1998 | Atalla | 709/231 |
| 5,945,987 A | * 8/1999 | Dunn | 345/718 |
| 6,028,600 A | * 2/2000 | Rosin et al. | 345/327 |

* cited by examiner

Primary Examiner—Vivek Srivastava
(74) Attorney, Agent, or Firm—Harold T. Fujii

(57) ABSTRACT

Channel information is displayed for a user in improved fashion by adjusting the amount of information according to the rate with which the user previews channels. For example, at a first rate of preview, the channel number, channel logo, program name and video could be displayed for each previewed channel, while at a faster rate, the channel number and logo could be displayed, and at a still faster rate the channel number alone could be displayed for each previewed channel. The rate of preview can be dictated by remote control signals, such as those produced by a remote control jog dial. The user can rotate the jog dial to preview channels at various rates and receive corresponding amounts of information for each previewed channel dependent upon the rate that the channels are previewed.

24 Claims, 8 Drawing Sheets

CHANNEL PREVIEW WITH RATE DEPENDENT CHANNEL INFORMATION

CROSS REFERENCE TO RELATED APPLICATIONS

This application is related to application Ser. No. 09/283,369, entitled "DISPLAY OF PREVIEWED CHANNELS WITH ROTATION OF MULTIPLE PREVIEWED CHANNELS ALONG AN ARC," filed on Mar. 31, 1999 by Eduardo A. Sciammarella, the contents of which are hereby incorporated by reference.

BACKGROUND OF THE INVENTION

1. Field of the Invention

This application relates to varying the amount of information provided for previewed channels according to the rate with which channels are previewed.

2. Description of the Related Art

Home entertainment continues to change at a rapid pace, with ever increasing content becoming seemingly available. For example, cable or satellite broadcasting system viewers may now expect to select programming from among hundreds of available channels. Also, the convergence of computer network architectures and traditional broadcast entertainment promises to further increase the availability of information.

Typically, a user may preview available channels in sequential fashion, or may manually jump to a given channel, with each previewed channel occupying the entirety of the display. Various electronic program guides (EPGs), such as those provided in a cable television system or satellite system, have also become available to preview channels. Specifically, EPGs typically provide textual programming information about available channels. Many EPGs display a grid detailing certain programming information for the channels available for viewing. The columns in the grid may represent various programming times, while the rows in the grid may represent various available channels. The intersection of rows representing the available channels with the column for a given time provides the programming information for that time.

While conventional EPGs have been helpful in compiling programming information, they may be inadequate interfaces for users navigating numerous channels, and do not provide the amount of information that a user may wish to receive.

SUMMARY OF THE INVENTION

In accordance with the present invention, methods and apparatus vary the amount of information corresponding to previewed channels dependent upon the rate that the user previews the channels. Generally, when the user previews available channels at a relatively slow rate, more information is displayed for each previewed channel, but at relatively faster channel preview rates, progressively less information is displayed. This allows that user to rapidly scan available channels, and to slow the preview rate for more information where interesting programming appears to be present.

In one embodiment, a jog dial on a remote control provides the control signals that determine the rate for previewing channels. The determined channel preview rate dictates the amount of information provided for each previewed channel. Rotating the jog dial can increase the preview rate, with various rates and corresponding amounts of information corresponding to various jog dial positions. The information provided for each previewed channel ranges from a relatively high amount (e.g., channel number, logo, program name, video and audio) for the slowest channel preview rate, to a relatively low amount (e.g., channel number only) for the fastest channel preview rate. Using the jog dial allows the user to focus on the display, and to alter the channel previewing rate and corresponding programming information without having to focus on the remote control buttons.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

Certain embodiments of the present invention described herein may be used with a direct broadcast satellite system. However, the ordinarily skilled artisan will recognize that other broadcast systems and formats, including without limitation cable and terrestrial systems, digital televisions, computer systems, and combinations of all such systems may utilize the method and apparatus of the present invention. Furthermore, in the following description, for purposes of explanation, numerous details are set forth, such as flowcharts and system configurations, in order to provide an understanding of an embodiment of the present invention. However, it will be apparent to one skilled in the art that these specific details are not required in order to practice the present invention.

Figure 1:
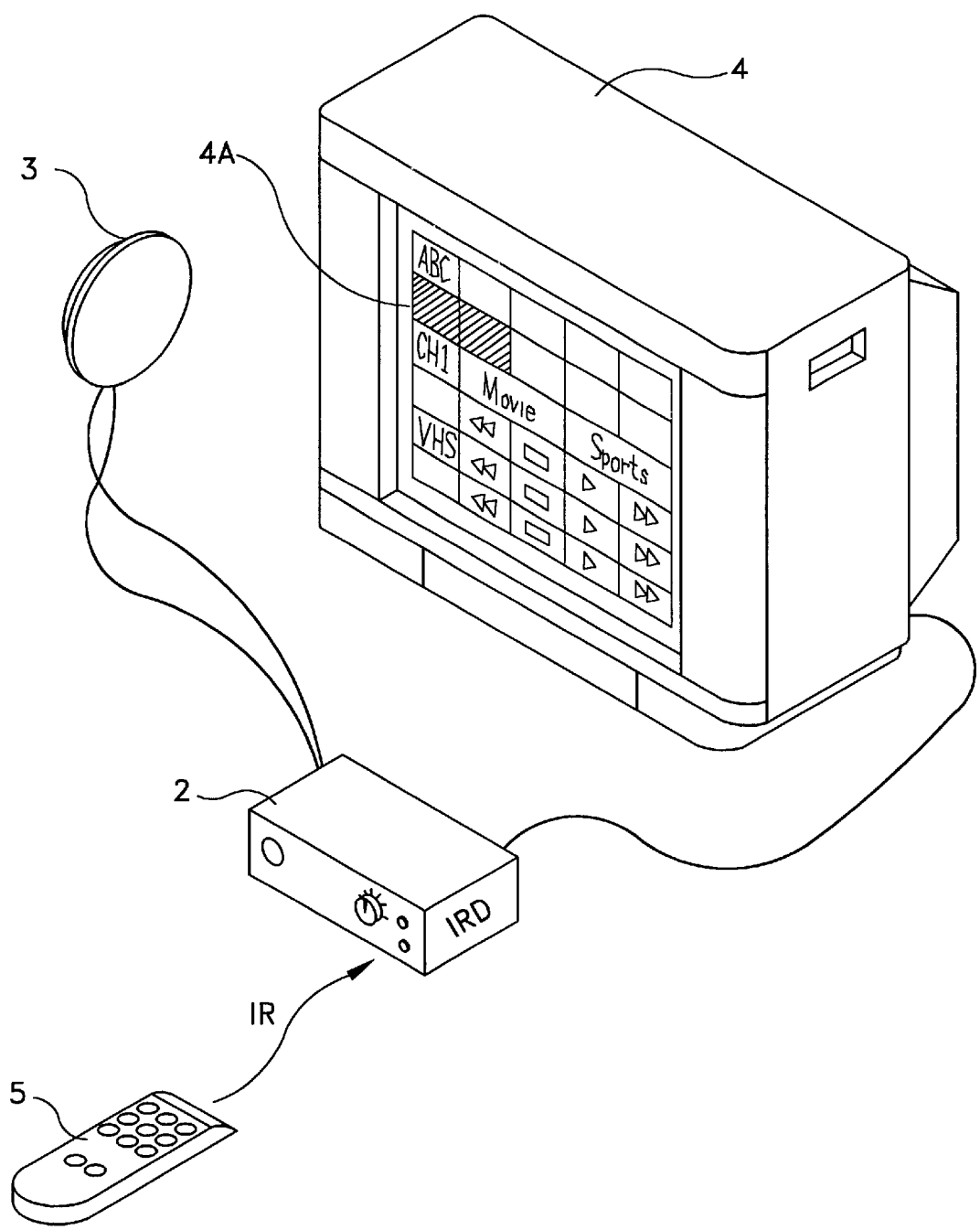
FIG. 1 is a schematic diagram illustrating an embodiment of a digital satellite system.

FIG. 1 is a schematic diagram illustrating a Direct Satellite System (DSS), which is an example of a system that may be used in conjunction with the present invention. The system has an antenna 3, an IRD (Integrated Receiver/Decoder) 2, a remote control 5, and a display device 4. Signals are transmitted by a satellite transponder and received by the antenna 3. The IRD 2 also includes circuitry for decoding the signals received by the antenna 3, and for appropriately tuning or filtering signals so as to provide a display output according to user's selections and desires.

Typically, the satellite transponder transmits packetized data in a time shared manner at a predetermined frequency. The IRD 2 receives the packetized data through the antenna 3, and then demodulates and decodes the data to produce signals appropriate for producing display 4a.

The IRD 2 may also be referred to as a set top box. Also, the functionality of the IRD 2 may be provided within the television housing. The IRD 2 may also be an open configuration that allows receipt from various programming sources (e.g., cable, satellite, to conventional television, HDTV, etc.).

Figure 2:
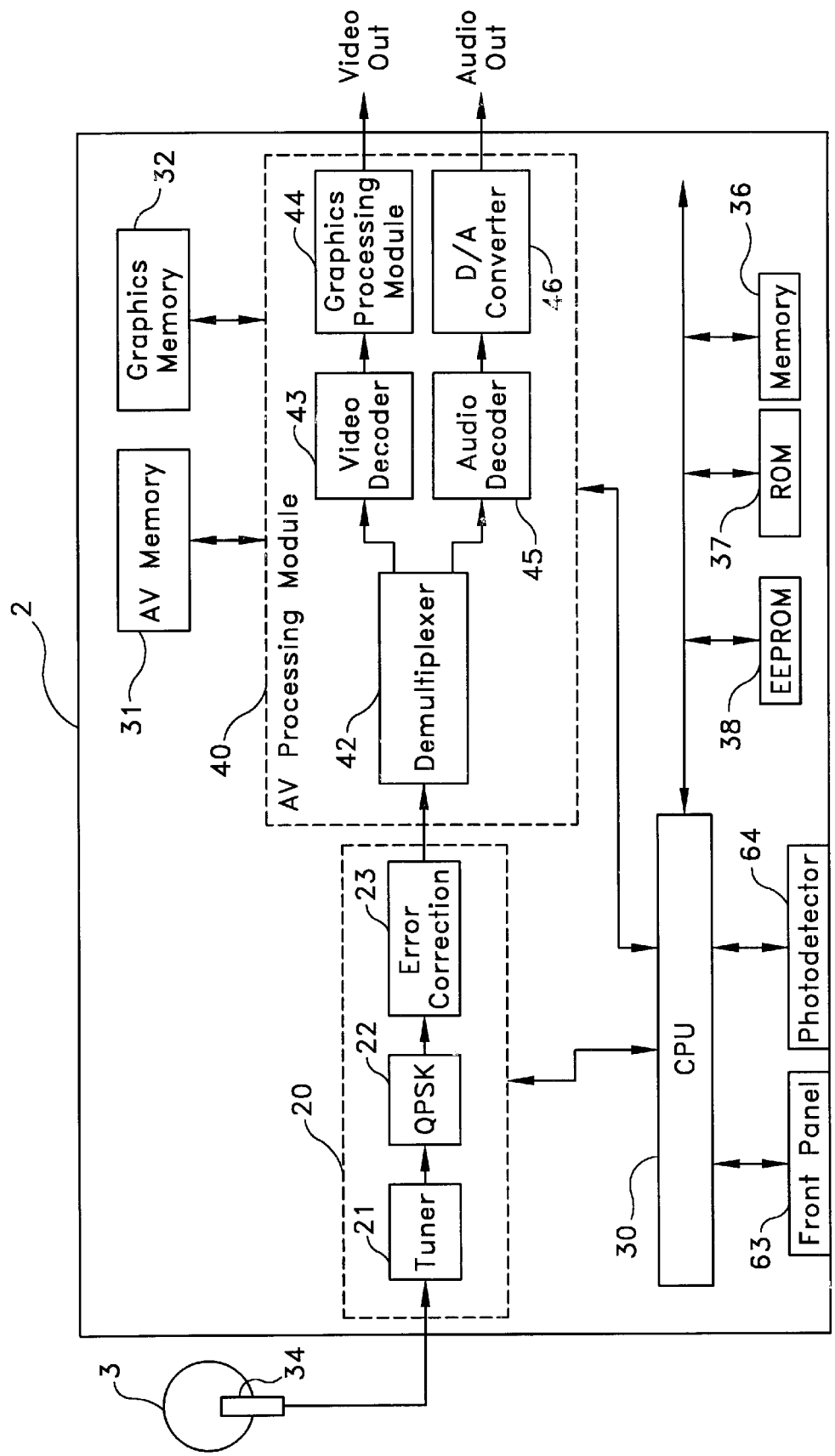
FIG. 2 is a block diagram illustrating an IRD including an embodiment of variable channel information indication in accordance with the present invention.

The block diagram of FIG. 2 illustrates an embodiment of an IRD 2 in further detail. As described above, the antenna 3 receives an encoded data signal sent from a satellite. The antenna 3 has a low noise block down converter 3a (LNB), which converts a frequency of a signal sent from the satellite to another frequency. This signal is decoded by the IRD 2. For IRD 2 embodiments receiving programming from other sources, other appropriate front end circuitry would be provided, such as a network interface for Internet sources, or an NTSC decoder for conventional television.

The IRD 2 includes a front end 20 having a tuner 21, quadrature phase shift keying (QPSK) demodulation circuit 22, and an error correcting circuit 23. A radio frequency (RF) signal output from the LNB 3a is supplied to the tuner 21, the tuner 21 output is supplied to the QPSK demodulation circuit 22 for demodulation, and the QPSK demodulation circuit 22 output is suppled to the error correcting circuit 23 for error correction.

The received data is an encoded packetized data stream that is passed to an AV processing module 40 that includes a demultiplexer 42, video decoder 43, audio decoder 45, graphics processing module 44 and D/A converter 46. The AV processing module 40 is in communication with AV memory 31 and EPG/Graphics memory 32, as well as the CPU 30. The demultiplexer 42 receives the packets of data from the error correcting circuit 23 and directs portions of the data stream as appropriate for processing, buffering data in the AV memory 31 or EPG/Graphics memory 32 as needed. Typically, the multiplexer 42 uses header information provided in the data stream to identify different types of data. For example, the header distinguishes which packets comprise video, audio and EPG data. Data that is identified as video data is provided to the video decoder 43, audio data to the audio decoder 45, and EPG data to the EPG/Graphics memory 32. The data format can be that specified by the Motion Pictures Expert Group (MPEG), including MPEG2 and MPEG4. Various conventional MPEG data parsing circuitry or software can be used for the demultiplexer 42, and conventional decoding techniques can be used for the decoders 43, 45.

The video decoder 43 decodes the video signal received from the demultiplexer 42. Also, as indicated, AV memory 31 may buffer video data during processing by the video decoder 43. The decoded signal is provided to the graphics processing module 44, which converts the signal to the format required for the display 4. For example, the graphics processing module may include a National Television System Committee (NTSC) encoder for conversion to luminance (Y) and chroma (C) signals which can be output through buffer amplifiers (not shown) as an S video signal. The graphics processing module 44 also provides graphics overlays, such as those provided when displaying an EPG over a video image, and also may provide a cursor layer for facilitating the receipt of cursor based input. For example, the graphics processing module 44 may access EPG data in the EPG/graphics memory 32 and display such data over a video image for a currently tuned channel, or may display such data over another graphical layer. Additionally, the graphics processing module 44 may grab still frames for currently tuned channels, store them in the EPG/Graphics memory 32, and later display the still frames along with the video for a subsequently previewed channel as provided in certain embodiments of the present invention, described further below. Conventional pixel mixing circuitry or software may be used for displaying the various image and graphics layers.

The audio decoder 45 decodes the digital audio signal, and the AV memory 31 may buffer data for processing by the audio decoder 45. The decoded digital audio signal is converted into an analog audio signal by D/A converter 46, and output through one or more amplifiers (not shown).

The various components of the AV processing module 40 are preferably provided as software executed by the CPU 30. However, the AV processing module 40 may be software, hardware, firmware, or any combination thereof. Also, in lieu of sole CPU 30 instruction execution, the AV processing module 40 (or any module in the IRD 2) may be a separate integrated circuit, and may have separate processing capabilities, such as those provided by an embedded RISC processor.

The CPU 30 executes instructions and uses data to provide functionality including the channel preview functionality of the present invention. Instructions to be executed by the CPU 30 are stored in ROM 37 and memory 36; however, such code may alternatively be stored in other types of memory. The CPU 30 also accesses data such as that stored in memory 36 and electrically erasable programmable read-only memory (EEPROM) 38, and processes user input received via the front panel 63 and the photodetector circuit 64. For example, the CPU 30 accesses user settings and preferences for processing information and configuring the system. The user settings may be stored in non-volatile memory, such as EEPROM 38, so that they are retained when power to the system is interrupted. The EEPROM 38 may also be updated to provide new IRD 2 control programs. A hard disk (not shown) may also be used to store data and code as needed.

Preferably, the CPU 30 maintains a list of pointers stored in memory 36 for the programming information stored in the EPG/Graphics memory 32 (although various memories 31, 32, 36 are shown to be separate, they can reside in a single memory if desired). Thus, when the user requests the display of an EPG on the screen or a switch between a broadcast and an EPG, the CPU 30 as instructed by the graphics processing module 44 accesses the pointers stored in the memory 36, the corresponding EPG data stored in the EPG/Graphics memory 32, and formats the EPG data to appropriately update the display. Some EPG data, such as that used to provide the look of the EPG, may originate in IRD 2 while other EPG data, such as the content portion may originate from the data transmitted to the IRD 2 as described above. Alternatively, all of the EPG data may originate in the data transmitted to the IRD 2, or may originate from any source.

Figure 3:
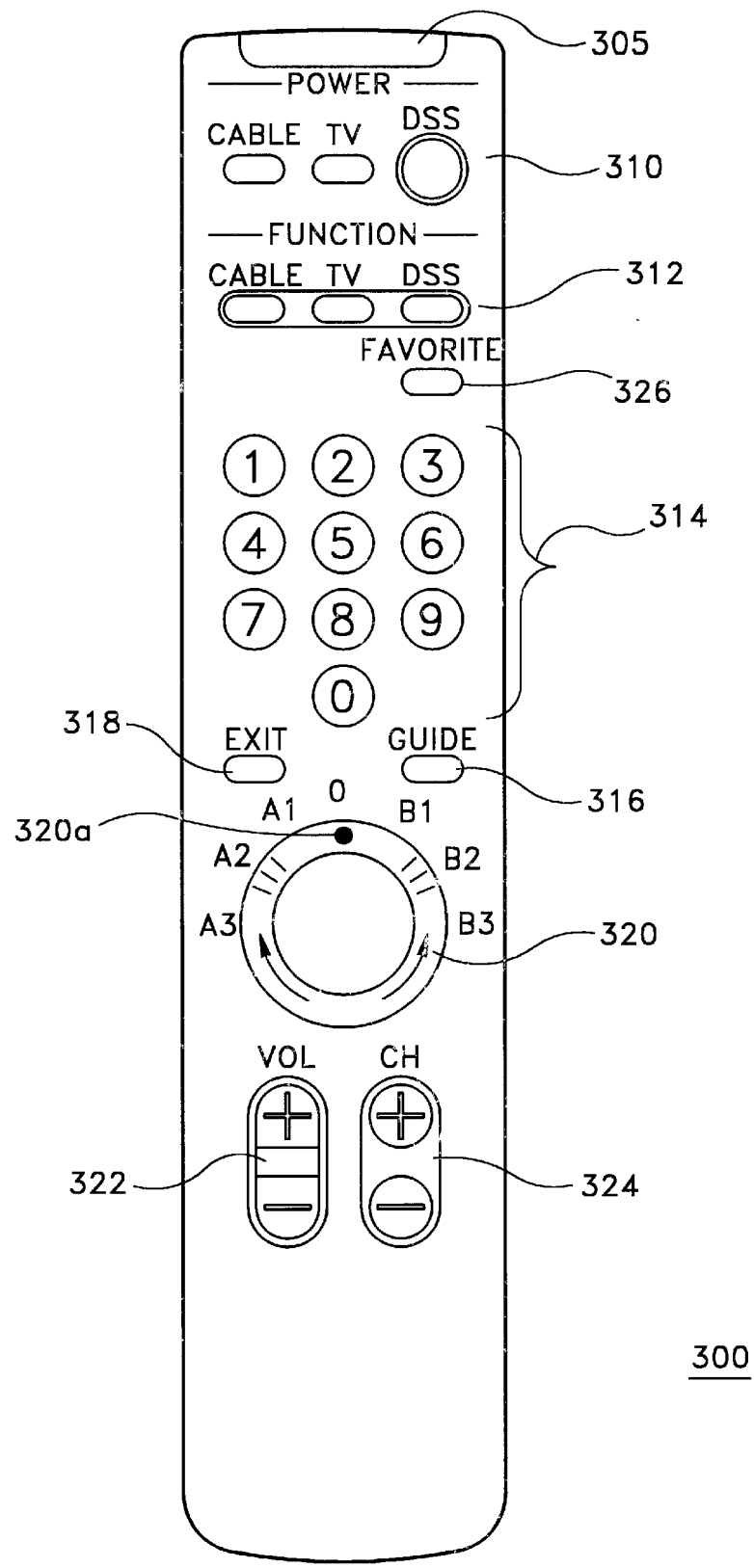
FIG. 3 is an illustration of a remote control for providing control signals used in accordance with the present invention.

FIG. 3 shows an example of a remote control 300 which allows the user to transmit control signals to the IRD 2. The remote control 300 may also be referred to as a remote controller, or a REMOTE COMMANDER. The remote control 300 has an infrared transmitting device 305, and various control buttons 310–324 for providing corresponding signals to be transmitted to the IRD 2. Specifically, the remote control 300 includes power buttons 310 to turn on devices for cable 310a, terrestrial broadcast television (TV) 310b, and satellite 310c programming. Alternatively, as described previously a single IRD 2 or set top box could service the various origins of programming, in which case a remote control 300 would likely not include separate power buttons.

Function buttons 312 allow the remote control 300 to alternately control the receivers for cable 312a, TV 312b or satellite 312c. Additionally, the numeric buttons 314 allow manual entry of channel numbers, the channel button 324 allows the user to sequentially navigate among channels, and the volume button 322 allows the user to adjust the audio volume. The guide button 316 allows the user to enter a programming guide mode, while the exit button 318 may be used to exit the programming guide for a return to the viewing mode. A favorite button 326 allows the user to enter a mode wherein a selected subset of available channels may be previewed or otherwise manipulated by the user. These channels may be selected using conventional menus and corresponding commands, using the illustrated control buttons, or other conventional menu and related control buttons (not shown).

The jog dial 320 is a rotating control button that allows the user to provide various control signals. The jog dial 320 rotates both clockwise and counterclockwise, and has a position indicator 320a which resides on the rotating dial and indicates the current position of the dial along with stationary markings (O, B1–B3, A1–A3). The default or rest position is typically that shown in FIG. 3, where the indicator 320a points to position "O". The user may also rotate the jog dial 320 counter-clockwise such that the indicator 320a points to position A1, then A2, then A3, or clockwise such that the indicator 320a points to position B1, then B2, then B3. When used in connection with this embodiment of the present invention, these different jog dial positions 320a can provide control signals-which dictate the direction and rate for previewing channels, as well as the amount of information provided for previewed channels, as is described further below.

Although a jog dial 320 is described as the control mechanism for variously controlling the channel preview rate and corresponding amount of provided information, the artisan will recognize that alternative input devices may be used. For example, a channel button 324 may have various input levels such that degrees of depression of the "+" or "−" portion of the channel button 324 may provide various control signals similar to the jog dial 320 levels, with the "+" side emulating positions A1–A3 and the "−" side emulating B1–B3. Alternatively, various discrete buttons (not shown) may be used to provide similar controls. Alternatively, the time interval between receipt of a signal requesting the current and next previewed channel may be used to determine the preview rate (i.e., in lieu of direct determination by control signal, time is used to calculate the channel preview rate).

Figure 4:
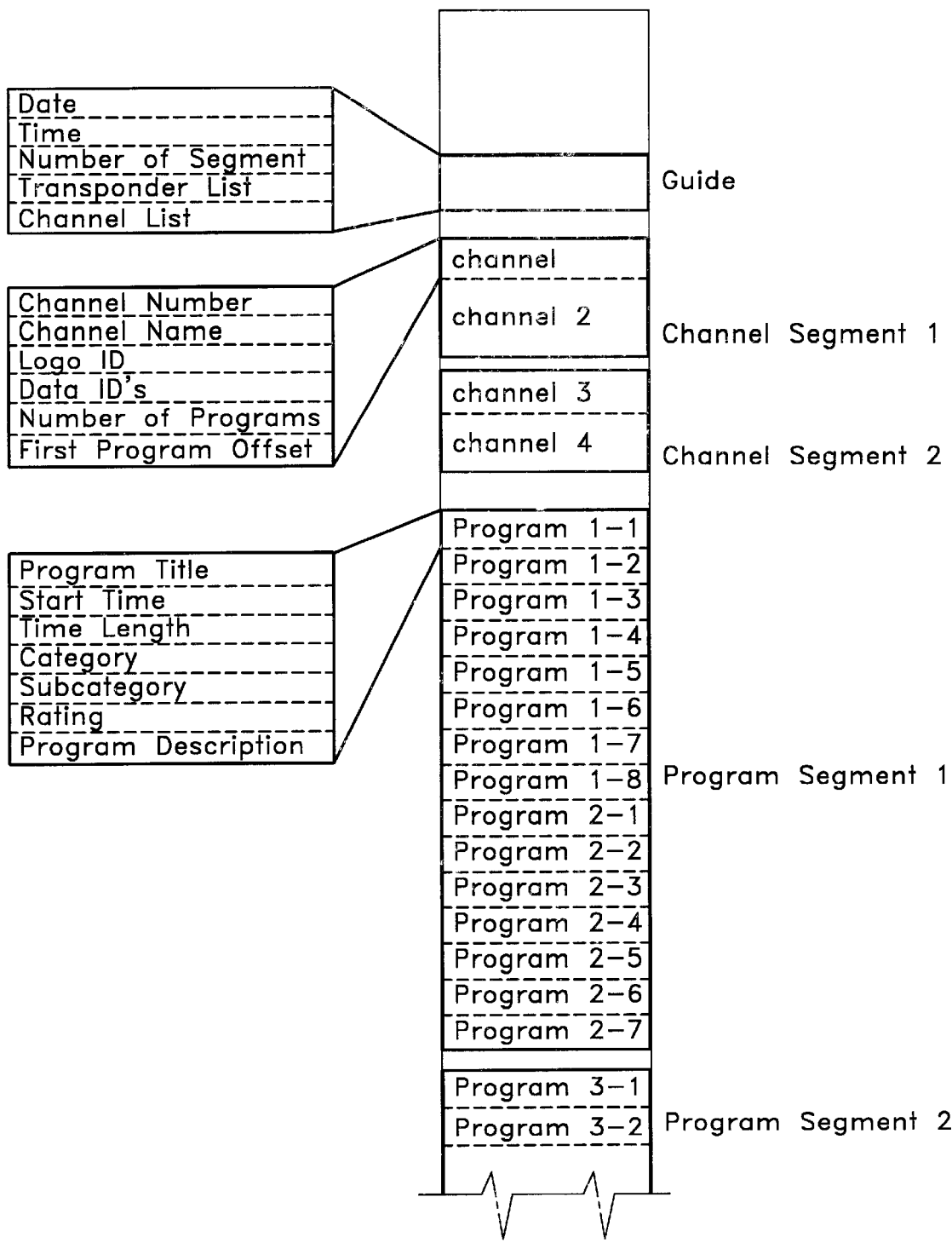
FIG. 4 is a schematic diagram illustrating an exemplary data table including programming information.

FIG. 4 is a schematic diagram illustrating EPG data, which is an example of some of the channel information that can be displayed in accordance with the present invention. The shown EPG data includes guide data, channel identification data, and program data. The guide data is general information, such as the current date and time. Additional information, such as transponder identification information, channel list, and segment information may also be included in the guide data. The channel identification data includes data relating to channels, such as the channel number, channel name (i.e., the call sign of a broadcast station), logo ID (i.e., an identification of the channel logo), data ID, which is an identification of a channel number of MPEG video data or MPEG audio data, number of programs, which identifies the number of programs to be transmitted on a channel during a predetermined time frame, and first program offset which identifies the offset from the header to the first channel data in a segment.

The program data includes the program title, start time of the program, time length of the program, program category such as movies, news, sports, etc., program subcategory such as drama, horror, children's for the movies category, or baseball, basketball, football for the sports category, the program rating and a program description that provides a detailed description of the program. The various program entries for each channel (e.g., 1-1 through 1-8) may be provided in the sequence with which they are to be shown, or in any desired fashion.

Figure 5:
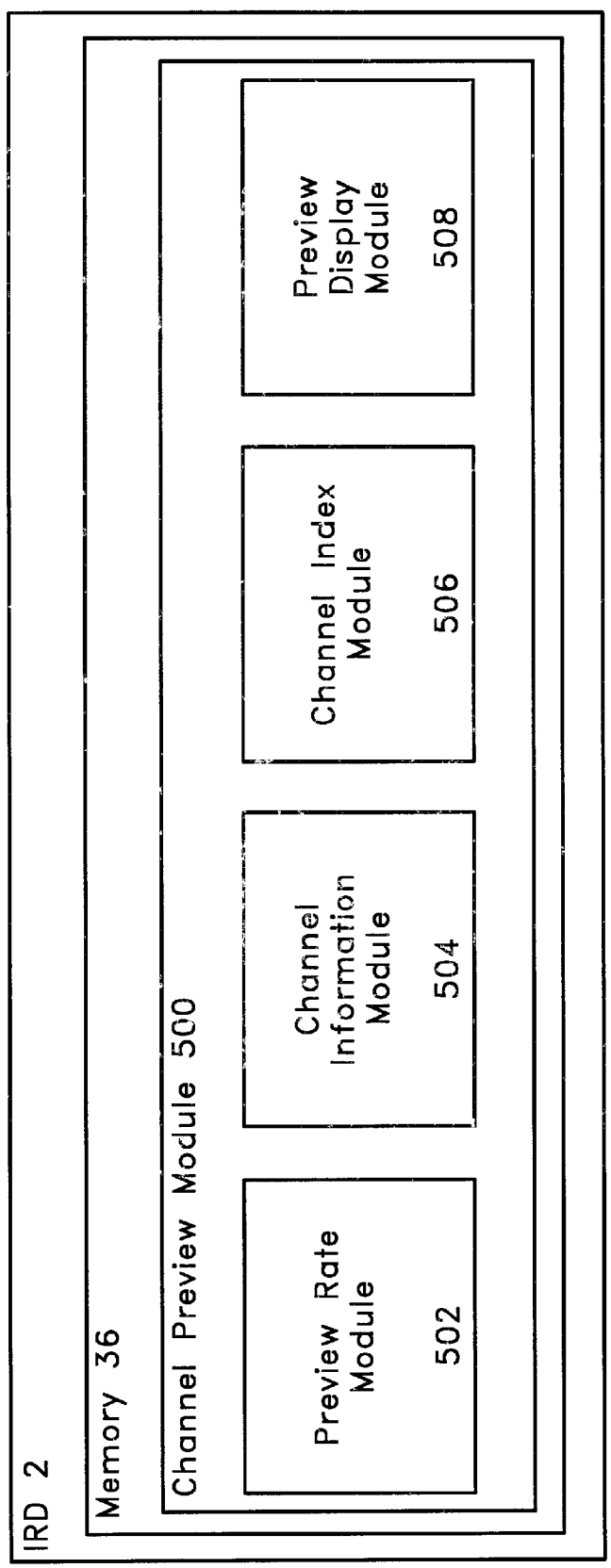
FIG. 5 is a block diagram illustrating an embodiment of a channel preview module in accordance with the present invention.

Referring now to the block diagram of FIG. 5, an embodiment of a channel preview module 500 is shown to reside within the memory 36 of the IRD 2, and to include a preview rate module 502, channel information module 504, channel index module 506, and preview display module 508. The channel preview module 500 receives control signals originated from the remote control, and in response to such control signals causes the display to be updated with programming information such as the EPG data, or other channel information such as video and audio for previewed channels, channel logos, and the like. Generally, the preview rate module 502 receives control signals and determines the current rate for previewing channels, and provides the channel preview rate for the channel information module 504, which determines the level of detail for previewed channels dependent upon that rate. The channel index module 506 maintains the list of channels being previewed, which may comprise all available channels, or a subset of the available channels such as favorite channels or predetermined subsets (e.g., preset categories), and the preview display module 508 provides the display configuration for previewing channels.

Preferably, the channel preview module 500, and its modules 502–508 are provided as software, although they may alternatively be provided as hardware, firmware, or any combination of software, hardware and firmware. The CPU 30 executes the instructions provided in the channel preview module 500 to provide the variable channel information functionality in accordance with the present invention.

Figure 6:
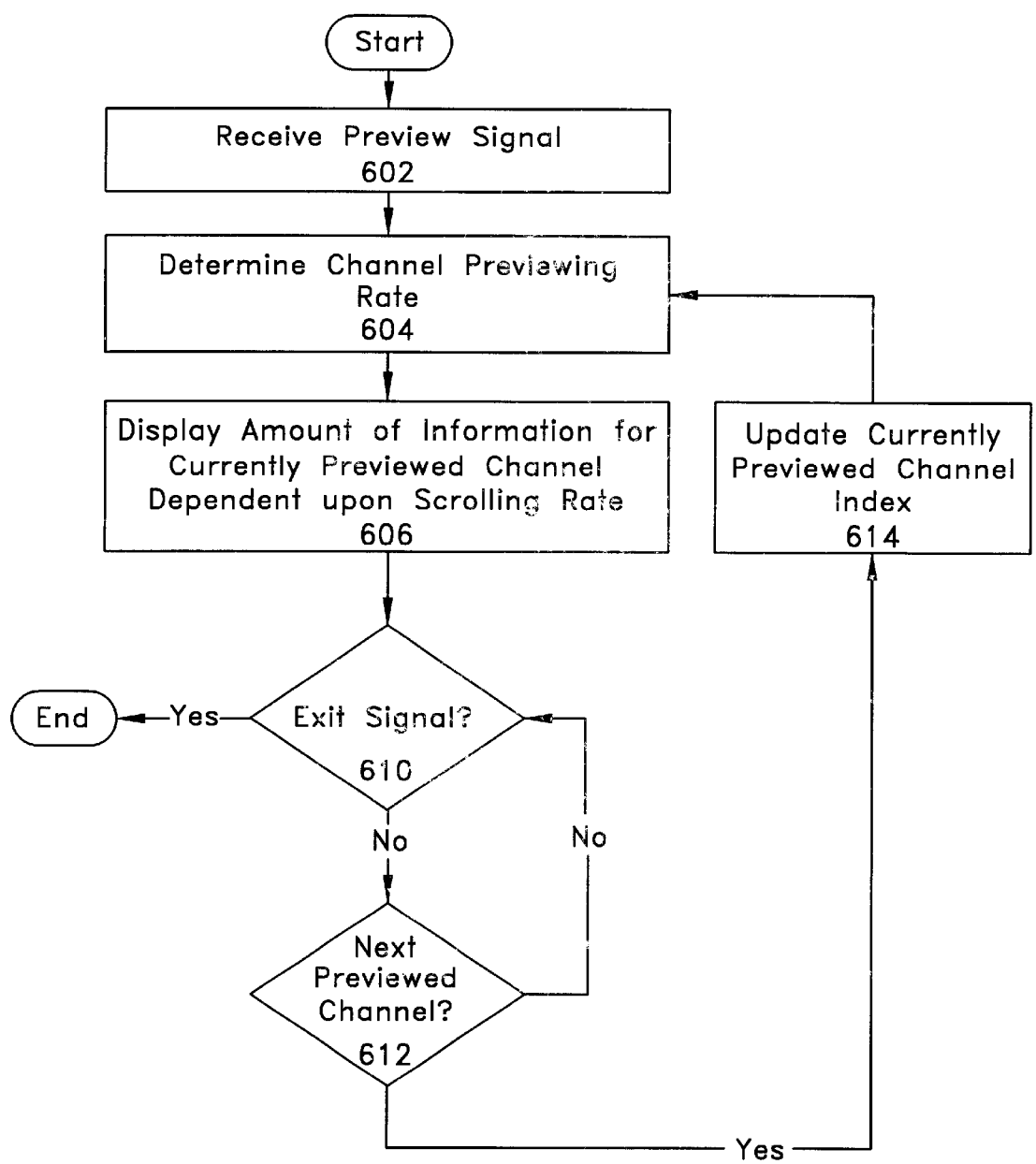
FIG. 6 is a flow chart illustrating an embodiment of a method for displaying programming information in accordance with the present invention.
Figure 8A:
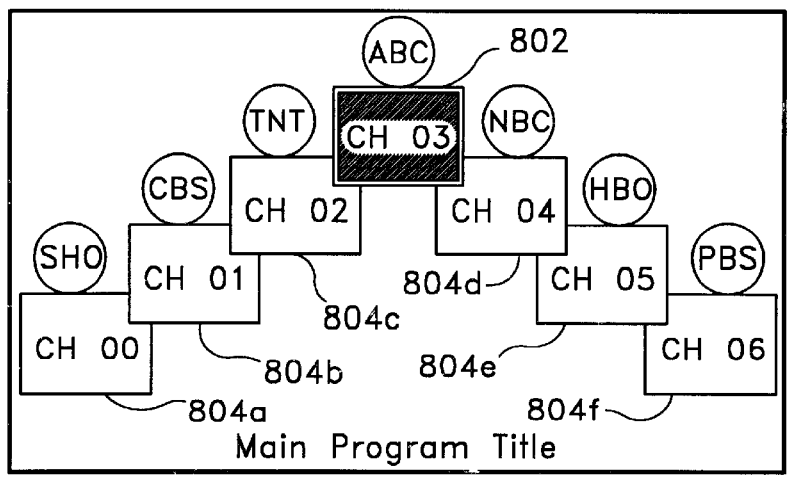
FIGS. 8A–C are diagrams illustrating an embodiment of displaying a variable amount of information relative to preview rate in accordance with the present invention.
Figure 8B:
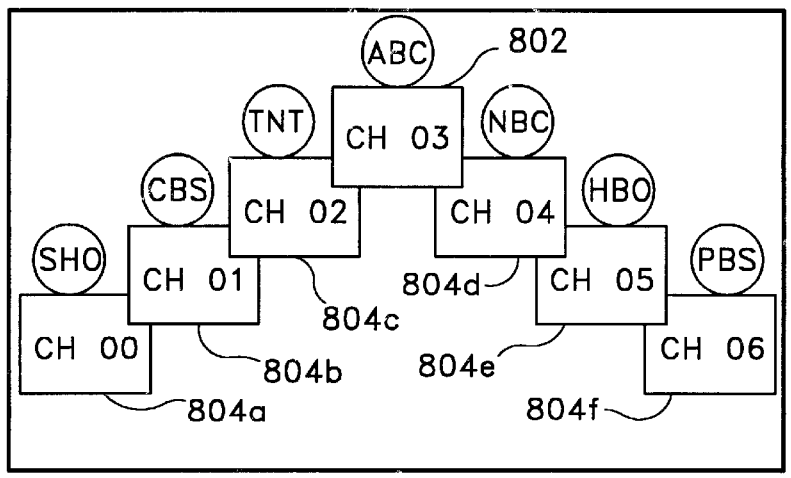
Figure 8C:
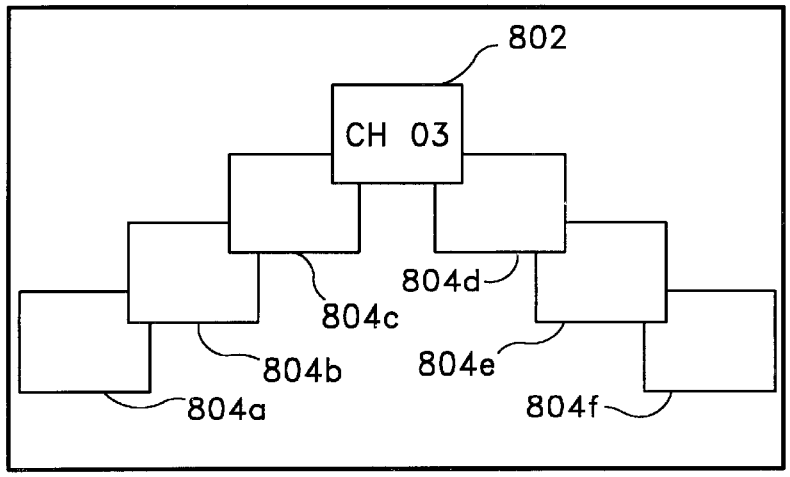

Referring now to the flow chart of FIG. 6 along with the block diagram of FIG. 5, an embodiment of a method 600 for displaying channel information in accordance with the present invention is now further described. In step 602, a preview signal is received by the channel preview module 500. The preview signal may result from various controls, such as when the user hits the guide button (316, FIG. 3), or simply when the user manipulates the jog dial out of the O position. When the preview signal is received, channel information for numerous channels is displayed for the user. Preferably, channel information is provided using a sequential arrangement of channel locations such as shown in FIGS. 8A–8C, which will be described further below. Of course, embodiments of the present invention can use alternative displays such as a grid having cells with to channel preview rate dependent amounts of information, or various other configurations as desired.

In step 604, the channel preview rate is determined by the preview rate module 502. Preferably, the channel preview rate can be discretely provided in the form of control signals provided to the IRD 2 dependent upon the various positions of the remote control jog dial (320, FIG. 3). Thus, first, second and third channel preview rates (which may be referred to as slow, medium and fast) for previewing channels can be directly signaled by the user through appropriate rotation of the jog dial. Alternatively, as described above, the channel preview rate can be provided in the form of control signals produced responsive to buttons, or the degree of depression or pressure that the user applies to the "+" or "−" of the channel switch, or can be calculated from the time interval between the user's selection of the current and next previewed channel.

The artisan will recognize the various alternatives for signaling and determining the channel preview rate. For example, the number of different channel preview rates may vary (e.g. two or four forward and reverse channel preview rates, in lieu of three). Additionally, the actual rate with which a previewed channel is updated from the current to the next previewed channel can vary dependent upon the ability to update the display, which in turn depends upon how much programming information will be included at the current channel preview rate. The actual rate may vary dependent upon the configuration of the system, which can be predetermined or reconfigured by the user as desired. Thus, the step 604 of determining the channel preview rate can rely on calculation or the like, receipt of signals which directly indicate the various rates, or various other alternatives.

Once the channel preview rate is determined, channel information for the currently previewed channel is displayed (step 608). The amount of provided channel information depends upon the determined channel preview rate. Generally, the level of detail is inversely proportional to the channel preview rate. That is, the most channel information is provided at the slowest channel preview rate, whereas the least programming information (e.g., only the channel number) is provided at the fastest channel preview rate. This optimizes the amount of information delivered to the user dependent upon the speed with which the user previews channels. An example of the programming information delivered to the user for fast, medium and slow channel preview rates is described in connection with FIGS. 7 and 8, below.

The channel information module 504 maintains a correlation between the channel preview rate and the channel information to be accessed and displayed. The correlation may be stored in the form of a table having fields for the channel preview rate, and related pointers or identifiers for the desired channel information. For example, for a first (e.g., slow) channel preview rate, the channel information module 504 may indicate that the channel number, channel logo, and program name fields should be accessed for each previewed channel. This information would then be used to access the information wherever it may be available, such as in the EPG data stored in the EPG/Graphics memory 32. Where additional information is sought, the module 504 may store flags indicative as to whether the information should be displayed. For example, such flags may indicate that audio and or video should be associated with each currently previewed channel. There, the video would be tuned in conventional fashion, and could be displayed in a portion of the screen using conventional techniques. Additional custom information could also be provided, such as a user's notes about the channel, which may be stored in a separate location, or with the EPG data, or any desirable location.

The preview display module 508 is in communication with the channel information module 504, and includes routines which determine how the previewed channels will be displayed. To carry out its functionality, the channel information module 504 may implement conventional graphical and display driving functionality of the graphics processing module 44, such as providing still images and corresponding graphical and textual information for previewed channels on graphical layers that can be simultaneously displayed using conventional pixel mixing techniques. The front end 20 and AV processing module 40 can also be used by the preview display module 508 to provide video and audio for a currently previewed channel in a particular display location.

The channel preview module 500 can include a user interface for allowing the user to update the settings in the channel information module 504, for customizing the information to be provided for the various channel preview rates, or for customizing the criteria for determining channel preview rates.

Still referring to FIG. 6, the channel information for the currently previewed channel remains until the user exits previewing (step 610) or signals for the next previewed channel (step 612). The user can exit previewing by pressing a remote control button or exit can automatically result if the next previewed channel is not requested for a predetermined time period. In the example of a jog dial, progression to the next previewed channel occurs provided that the user keeps the jog dial in a position that indicates forward or reverse previewing, with a rate dependent upon the jog dial position. The currently previewed channel index is updated for the new current channel in step 614, and steps 604 and 606 are then repeated to update the display to include the new programming information. The channel index module (506, FIG. 5) maintains the list of channels, as described above.

Figure 7A:
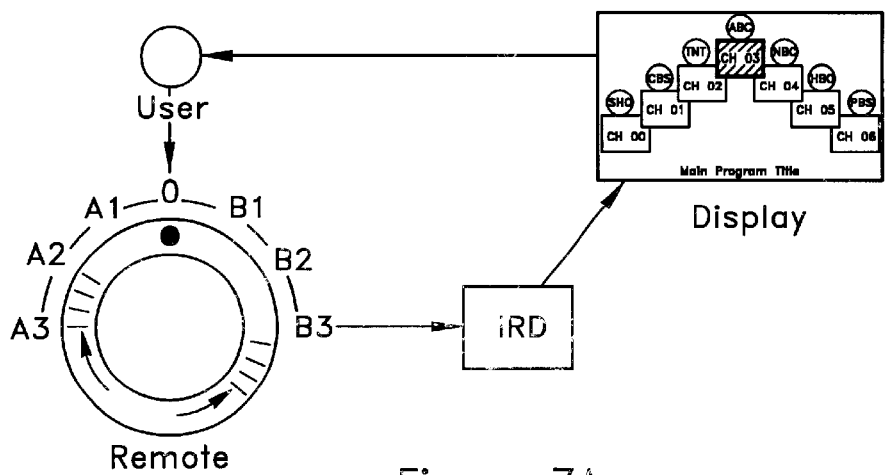
FIGS. 7A–C are flow diagrams illustrating an embodiment of the relationship between jog dial signals and channel preview rate in accordance with the present invention.
Figure 7B:
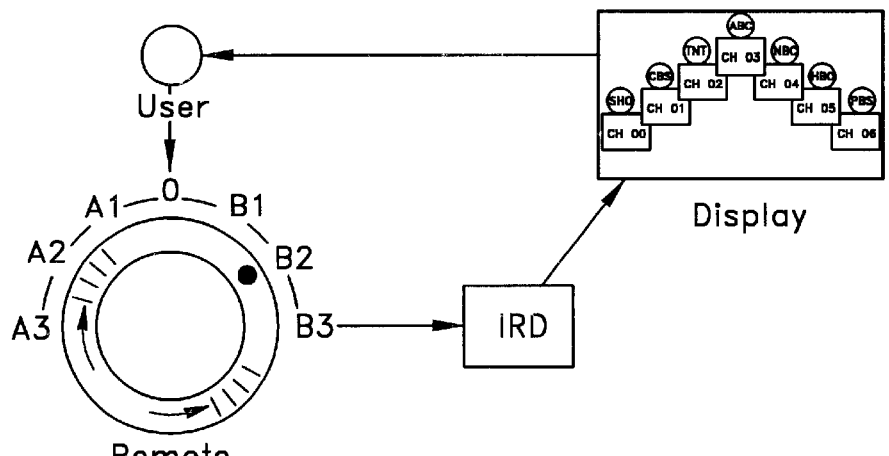
Figure 7C:
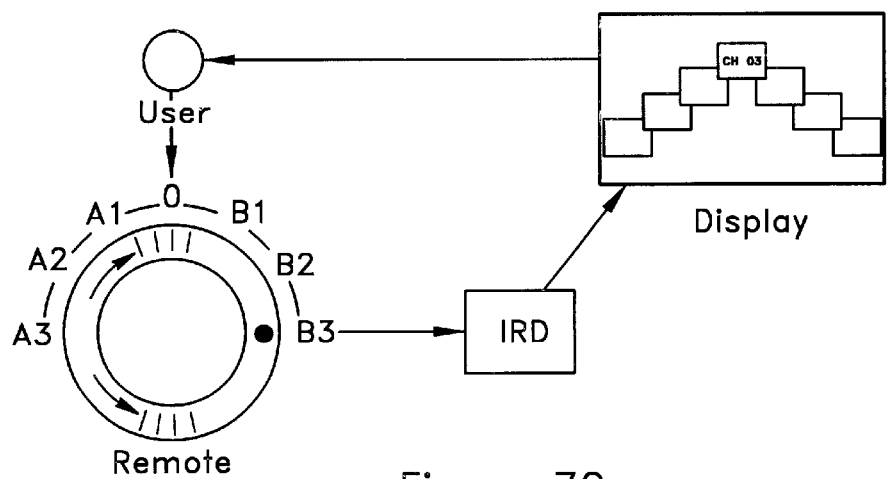

The flow diagrams of FIGS. 7A–C illustrate an example of varying the level of channel information in accordance with the present invention. Specifically, FIG. 7A illustrates a situation where the jog dial 320 is rotated clockwise from the default position, such that the indicator 320a points to position B1. The control signal corresponding to this position is transmitted to the IRD 2, and indicates a first (slow) channel preview rate. The IRD 2 updates the display 4 to provide the appropriate channel information for previewed channels as dictated by the channel preview rate.

FIGS. 8A–8C illustrate one embodiment of displaying previewed channels and varying the amount of provided information according to preview rate. Referring first to FIG. 8A, at the slowest available channel preview rate, the user receives the maximum amount of information. Available channels are arranged with the currently previewed channel residing at a main channel location 802 and with other channels at remaining channel locations 804. Preferably, the channels are arranged sequentially, such as in an arc with the main channel location 802 residing at the apex. As a channel is previewed, it resides in the main channel location 802. When previewing in this type of arrangement, the user previews the sequence of channels, causing them to rotate along the sequence of remaining channel locations 804 and successively reside in the main channel location 802 for preview. This type of previewing may be referred to more specifically as scrolling through available channels. Preferably, particularly with the arc based arrangement, the rotation of channels to be previewed along the arc corresponds with the direction that the jog dial 320 is rotated, which provides for intuitive preview operation. Specifically, rotating the jog dial 320 clockwise into the "B" positions causes previewed channels to rotate clockwise along the arc. Where this causes a series of higher numbered channels to reside in the main channel location, this can be referred to as forward scrolling, and where it causes a series of lower numbered channels to reside in the main location it can be referred to as reverse scrolling.

In the example illustrated in FIG. 8A, the channel number (3) and channel logo ("ABC") are shown for each channel previewed at the first rate. Additionally, the audio and video, as well as the title of the program on the currently previewed channel (denoted "Main Program Title" in FIG. 8A) residing in the main channel location 802. For the remaining channel locations 804, the channel number and logo continue to be shown. Additionally, still images can be shown for channels residing in the remaining channel locations 804.

If the user continues to preview channels by maintaining the jog dial 320 in the B1 position, the display will update after a predetermined period. Specifically, the channels will rotate clockwise along the channel information positions 802, 804. More specifically, the channel in remaining channel location 804c (2, "TNT") will rotate into the main channel location 802 as the (next) currently previewed channel, and will have video and audio along with the other channel information. Additionally, the channel previously in the main channel location 802 (3, ABC) would rotate into remaining channel location 804d, the channel residing in location 804b would move to location 804c, and so on. Where necessary, certain channels would no longer be displayed (the one in location 804f), and previously absent channels would enter the display (e.g., to is location 804a).

When a channel ceases to be the currently previewed channel, the video and audio for that channel are no longer provided. However, a recent still image may be retained for display. This can be accomplished by grabbing frames of video data while the channel is the currently previewed channel, and accessing the most recent still frame for the channel after its preview period is complete. Alternatively, any previously stored still image can be displayed for those channels residing in remaining locations 804, or even the main channel location 802.

As the rate of previewing is increased, the amount of provided information is decreased. FIG. 7B illustrates the jog dial 320 with the cursor 320a in the B2 position, which corresponds to a channel preview rate that is faster than that for the B1 position. This channel preview rate can be referred to as a medium (or second) channel preview rate. As shown in the display 4B of FIG. 8B, for the medium channel preview rate the information for each previewed channel is the channel number and channel logo. As with the slow previewing the channels rotate clockwise into the main channel location 802 as they are previewed. As channel preview rate increases, the amount of information provided to the user decreases. Here, for example, only the channel number and logo are provided for each previewed channel, and audio and video are not provided for the currently previewed channel. However, a still image, preferably one that is previously stored in EPG/Graphics memory 32, may be provided for the currently previewed channel residing in the main channel location 802.

FIGS. 7C and 8C illustrate a still faster channel preview rate, as dictated by causing the jog dial to reside at position B3. For this, the fastest channel preview rate described in this embodiment, the least amount of programming information is provided. In this example, only the channel number for the currently previewed channel residing in the main channel location 802 is provided, as illustrated in the display 4C of FIG. 8C. No information is provided for the channels residing in the remaining channel locations 804.

Channels can also be scanned in the opposite direction by causing the jog dial 320 indicator to be in the A1, A2 and A3 positions. In an arc based embodiment, maintaining the jog dial 320 in the "A" positions causes counter-clockwise rotation of channels to be previewed. The A side operation is analogous to that on the B side. Specifically, position A1 provides a relatively slow (counter-clockwise) preview having the same amount of information as described about for the B1 position. Similarly, A2 position produces the same information as described for the B2 position, and A3 the same information as B3, the only difference being-previewing direction.

Thus, methods and apparatuses for providing channel information that varies dependent upon a channel preview rate controlled by user input is provided in accordance with the present invention. Although the present invention has been described in considerable detail with reference to certain embodiments thereof, other embodiments are possible. For example, although certain specific information (e.g., channel number, logo, program name, audio, video) is described in connection with various channel preview rates, and certain channel preview rate breakdowns (e.g., slow, medium, fast) and criteria (e.g., jog dial position) are described, myriad alternatives may be provided without departing from the scope of the present invention (e.g., different information categories, different available rates, different controls). Therefore, the spirit and scope of the appended claims should not be limited to the description of the embodiments contained herein.

What is claimed is:

1. A method for displaying information corresponding to previewed channels, the method comprising:

determining that channels are being previewed at a first rate to provide a first set of previewed channels;

responsive to determining that channels are being previewed at the first rate, providing a first set of information corresponding to each channel in the first set of previewed channels as it is being previewed;

determining that channels are being previewed at a second rate to provide a second set of previewed channels, the second rate being faster than the first rate; and responsive to determining that channels are being previewed at the second rate, providing a second set of information corresponding to each channel in the second set of previewed channels as it is being previewed, the second set of information having less information than the first set of information;

wherein the first set of information comprises a channel number, a channel logo and a program name and the second set of information comprises the channel number and channel logo.

2. The method of claim 1, further comprising:

determining that channels are being previewed at a third rate to provide a third set of previewed channels, the third rate being faster than the second rate; and responsive to determining that channels are being previewed at the third rate, providing a third set of information corresponding to each channel in the third set of previewed channels as it is being previewed, the third set of information having less information than the second set of information.

3. The method of claim 1, wherein the first set of information further comprises a video preview.

4. The method of claim 2, wherein the first set of information comprises a channel number, a channel logo and a program name, the second set of information comprises the channel number and the channel logo, and the third set of information comprises the channel number.

5. The method of claim 1, wherein channels are previewed at the first rate responsive to a first control signal received from a remote control used with the video system, and channels are previewed at the second rate responsive to a second control signal received from the remote control.

6. The method of claim 5, wherein channels are previewed at the third rate responsive to a third control signal received from the remote control.

7. The method of claim 5, wherein the first and second control signals are respectively produced responsive to a first position and a second position of a jog dial on the remote control.

8. The method of claim 6, wherein the first, second, and third control signals are respectively produced responsive to a first position, a second position and a third position of a jog dial on the remote control.

9. An apparatus for displaying information corresponding to previewed channels, the apparatus comprising:
   a rate module, which determines that channels are being previewed at a first rate to provide a first set of previewed channels, and determines that channels are being previewed at a second rate to provide a second set of previewed channels, the second rate being faster than the first rate; and
   a channel information module, in communication with the rate module, which responds to determining that channels are being previewed at the first rate by providing a first set of information corresponding to each channel in the first set of previewed channels as it is being previewed, and responds to determining that channels are being previewed at the second rate by providing a second set of information corresponding to each channel in the second set of previewed channels as it is being previewed, the second set of information having less information than the first set of information;
   wherein the first set of information comprises a channel number, a channel logo and a program name and the second set of information comprises the channel number and channel logo.

10. The apparatus of claim 9, wherein the rate module determines that channels are being previewed at a third rate to provide a third set of previewed channels, the third rate being faster than the second rate, and responds to determining that channels are being previewed at the third rate by providing a third set of information corresponding to each channel in the third set of previewed channels as it is being previewed, the third set of information having less information than the second set of information.

11. The apparatus of claim 9, wherein the first set of information further comprises a video preview.

12. The apparatus of claim 10, wherein the first set of information comprises a channel number, a channel logo and a program name, the second set of information comprises the channel number and the channel logo, and the third set of information comprises the channel number.

13. The apparatus of claim 9, wherein previewing through available channels at the first rate is responsive to a first control signal received from a remote control used with the video system, and previewing available channels at the second rate is responsive to a second control signal received from the remote control.

14. The apparatus of claim 13, wherein previewing available channels at the third rate is responsive to a third control signal received from the remote control.

15. The apparatus of claim 13, wherein the first and second control signals are respectively produced responsive to a first position and a second position of a jog dial on the remote control.

16. The apparatus of claim 14, wherein the first, second, and third control signals are respectively produced responsive to a first position, a second position and a third position of a jog dial on the remote control.

17. An apparatus for displaying information corresponding to previewed channels, the apparatus comprising:
   a rate determining means, for determining that channels are being previewed at a first rate to provide a first set of previewed channels, and for determining that channels are being previewed at a second rate to provide a second set of previewed channels, the second rate being faster than the first rate; and
   a channel information means, for responding to previewing available channels at the first rate by providing a first set of information corresponding to each channel in the first set of previewed channels as it is being previewed, and for responding to previewing available channels at the second rate by providing a second set of information corresponding to each channel in the second set of previewed channels as it is being previewed, the second set of information having less information than the first set of information;
   wherein the first set of information comprises a channel number, a channel logo and a program name and the second set of information comprises the channel number and channel logo.

18. The apparatus of claim 17, wherein the rate determining means includes routines for determining whether channels are being previewed at a third rate to provide a third set of previewed channels, the third rate being faster than the second rate; and wherein the channel information means includes routines for responding to previewing channels at the third rate by providing a third set of information corresponding to each channel in the third set of previewed channels as it is being previewed, the third set of information having less information than the second set of information.

19. The apparatus of claim 17, wherein the first set of information further comprises a video preview.

20. The apparatus of claim 18, wherein the first set of information comprises a channel number, a channel logo and a program name, the second set of information comprises the channel number and the channel logo, and the third set of information comprises the channel number.

21. The apparatus of claim 17, wherein channels are previewed at the first rate responsive to a first control signal received from a remote control used with the video system, and channels are previewed at the second rate responsive to a second control signal received from the remote control.

22. The apparatus of claim 21, wherein channels are previewed at the third rate responsive to a third control signal received from the remote control.

23. The apparatus of claim 21, wherein the first and second control signals are respectively produced responsive to a first position and a second position of a jog dial on the remote control.

24. The apparatus of claim 22, wherein the first, second, and third control signals are respectively produced responsive to a first position, a second position and a third position of a jog dial on the remote control.

* * * * *